United States Patent [19]

Andersson et al.

[11] Patent Number: 6,047,738
[45] Date of Patent: Apr. 11, 2000

[54] METHOD AND AN ARRANGEMENT FOR CLOSING OF AT LEAST ONE END OF A TUBE AND A PLUG FOR SAID CLOSING

[76] Inventors: Lars-Olof Andersson, Parkvagen 9, S-330 19 Berdaryd; Bengt Fjällström, Sodra Kungsvagen 9, S-522 34 Tidaholm, both of Sweden

[21] Appl. No.: 08/669,567

[22] PCT Filed: Feb. 9, 1995

[86] PCT No.: PCT/SE95/00133

§ 371 Date: Aug. 8, 1996

§ 102(e) Date: Aug. 8, 1996

[87] PCT Pub. No.: WO95/21777

PCT Pub. Date: Aug. 17, 1995

[30] Foreign Application Priority Data

Feb. 10, 1994 [SE] Sweden ................................. 9400443

[51] Int. Cl.[7] ................................................. F16L 55/10
[52] U.S. Cl. .............................. 138/89; 53/489; 53/298; 156/514
[58] Field of Search ........................... 138/89, 89.1–89.4; 53/471, 485, 489, 478, 51, 75, 296, 297, 298, 328, 319, 312; 156/510, 516, 521, 514

[56] References Cited

U.S. PATENT DOCUMENTS

| | | | |
|---|---|---|---|
| 1,114,323 | 10/1914 | Westlake | 53/489 X |
| 3,050,914 | 8/1962 | Morgan, Jr. | 53/489 X |
| 3,358,869 | 12/1967 | Palmer et al. | 138/89 X |
| 3,434,908 | 3/1969 | MacDonald | 156/514 |
| 3,491,510 | 1/1970 | Sternau | 53/297 X |
| 3,521,422 | 7/1970 | Tabor | 53/489 X |
| 3,538,678 | 11/1970 | Lefort | 53/319 |
| 4,338,765 | 7/1982 | Ohmori et al. | 53/471 X |
| 4,362,002 | 12/1982 | Rowland et al. | 53/297 X |
| 4,599,123 | 7/1986 | Christensson | 53/489 X |
| 4,613,043 | 9/1986 | Reid et al. | 53/489 X |
| 4,625,498 | 12/1986 | Parsons | 53/298 X |
| 4,682,463 | 7/1987 | Foldesi | 53/298 |
| 5,083,416 | 1/1992 | Schneider et al. | 53/489 |
| 5,230,205 | 7/1993 | Hautemont | 53/485 |
| 5,269,123 | 12/1993 | Marchesini | 53/51 X |
| 5,493,849 | 2/1996 | Itoh | 53/489 |
| 5,519,984 | 5/1996 | Beussink et al. | 53/489 |
| 5,566,529 | 10/1996 | Sireix | 53/489 X |
| 5,606,847 | 3/1997 | Joensson et al. | 53/298 X |

*Primary Examiner*—Patrick F. Brinson
*Attorney, Agent, or Firm*—Ostrolenk, Faber, Gerb & Soffen, LLP

[57] ABSTRACT

The invention relates to a method and an arrangement for closing of at least one end of a tube to protect the tube (8) against internal dirtying. According to the method, a strip (5) comprising a number of plugs (4) is fed up to a position in front of a tube (8) situated in a punch sleeve (9), at said position a plug (4) in the strip (5) is in a position just in front of the tube end (12), whereupon a punch (7) presses the strip (5) with the plug (4) against the tube (8) and the punch sleeve (9), so that the punch (7) in the end of its working stroke after pressing the plug (4) into the tube end (12) is punching out the plug (4) from said strip (5). The plug (4) formed for closing of a tube end is together with plugs, formed in the same way, integrally formed one after another at a predetermined distance in a longitudinal row in a continuous strip (5).

8 Claims, 1 Drawing Sheet

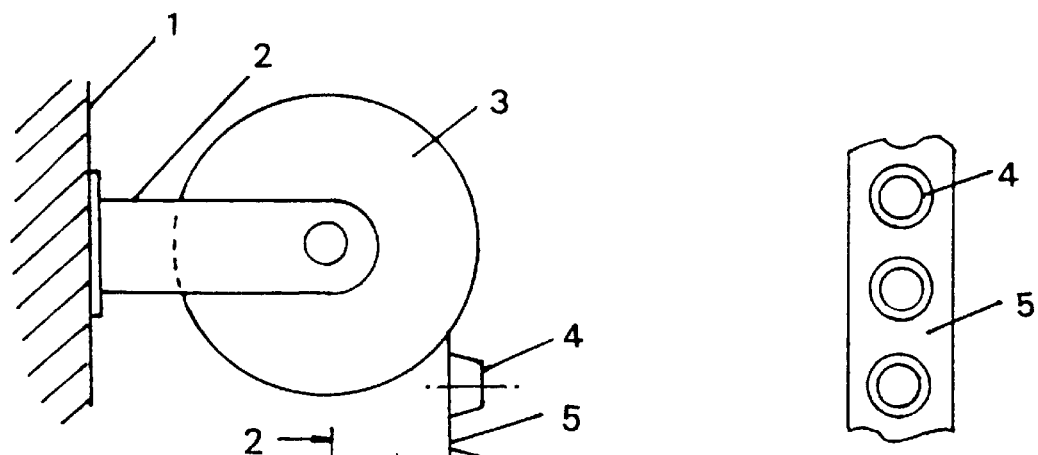
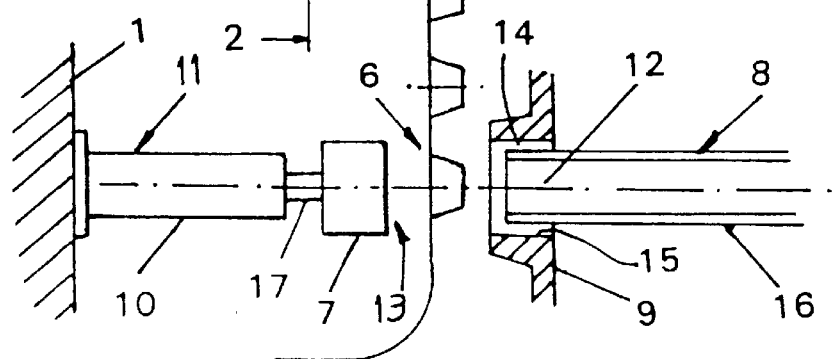
FIG. 2
FIG. 1

METHOD AND AN ARRANGEMENT FOR CLOSING OF AT LEAST ONE END OF A TUBE AND A PLUG FOR SAID CLOSING

The present invention relates to a method and an arrangement for closing of at least one end of a tube for preventing internal dirtying of said tube during further handling for example in a process and a plug intended to close up the tube end.

Today plugging up of the ends of tubes, for example in cars, occurs immediately after cleaning of the tubes. Before cleaning and the plugging up, the tubes have been cut up to required, predetermined lengths. The plugging normally occurs by plastic plugs, which are manually fixed to the tube ends. This has appeared to be a very time consuming and staff requiring procedure.

One object with the present invention is to provide a method and an arrangement of the kind mentioned above by which the drawbacks mentioned above are eliminated at the same time as the method is both simple and inexpensive to realize by aid of the arrangement and the plugs.

Thanks to the invention, one has now provided a method and an arrangement, which, with out need of special staff, automatically can close the ends of a cut up tube in connection with an internal cleaning process or in sequence with an internal tube washing in order to protect cleaned tubes insides from dirtying during further handling.

The invention is decribed below by aid of a preferred example with reference to the drawings enclosed, in which FIG. 1 shows a schematic sectional view from one side of an arrangement for performing of the method according to the invention and FIG. 2 shows a partial view from the left of the plug strip fed from a supply reel.

As can be seen from the drawings, the arrangement for performing of the method according to the invention comprises in the preferred embodiment a supply reel 3 having plugs 4 in a strip 5 supported by brackets 2 in a machine stand 1, a punch 7 displacable forwards and backwards over an opening gap 6 for cooperation with a punch sleeve 9 supported by a tube 8 and a driving cylinder 10 for effecting the punch 7, the end 11 which does not support the punch 7, is fixed to the machine stand 1.

The strip 5 has in the example illustrated a row of one after another and in a line orientated plugs 4, which are formed in the strip material and provided at a predetermined distance from each other. The plugs 4 are formed conical so that they can be pressed onto a tube end 12 by aid of the punch 7. The punch 7 has a cavity 13 which coresponds the outer diameter of tube end 12 and the punch sleeve 9 positions the tube 8 so that an annular gap 14 exists between the inner casing 15 of the punch sleeve 9 and the outer casing 16 of the tube 8, in which gap 14 the punch 7 is pressed into during the punching out of a plug 4 from the strip 5. The punch 7 is displaceable into and out from the driving cylinder 10 by aid of a piston stem 17 and the tube end is positioned in the punch sleeve by aid of fastening elements not illustrated in the drawing.

The plug 4 formed for closing of at least one end 12 of a tube 8 in order to protect the tube 8 against internal dirtying is, as mentioned above, preferable integrally formed in a strip 5 together with at least one line of other, similarly formed plugs 4, said strip 5 with associated plugs 4 are made of a suitable plastic material. The strip which positions the plugs in relation to each other do not need to have a connected, solid formation, but can consist of threads, strings or the like connecting together said plugs.

The method to protect a tube 8 cleaned inside from dirtying occurs in the following way.

A strip 5 is fed from the supply reel 3. Said strip containing a number of plugs 4 up to a position in the opening gap 6, where a plug 4 is in a position right in front of the tube end 12 of the tube 8 in the punch sleeve 9. After that, the punch 7 is pushed by the piston stem 17 out from the driving cylinder 10 to the right in the drawing and pushes the strip 5 with the plug 4 towards the tube 8 and the punch sleeve 9. In the end of the stroke of the cylinder 10, the plug 4 is pressed into the tube end 12 at the same time as the plug 4 is punched out from the strip 5, whereupon the punch 7 returns to its initial position before next working stroke and the tube 8 is automatically changed to a new unplugged tube 8. Such a method can be performed at the two tube ends simultaneously.

We claim:

1. A method for closing of at least one end of a tube for protecting of the tube against internal dirtying, characterized in that a strip (5) comprising a number of plugs (4) is fed to a position in front of a tube (8) situated in a punch sleeve (9), at said position a plug (4) in the strip (5) is in a position just in front of the tube end (12), whereupon a punch (7) presses the strip (5) with the plug (4) towards the tube (8) and the punch sleeve (9), so that the punch (7) at the end of its working stroke after having pressed the plug (4) into the tube end (12) to close the end thereof is punching out the plug (4) from said strip (5).

2. A method according to claim 1, characterized in that the strip (5) having the plugs (4) is wound off from a supply reel (3) and is fed in between the punch (7) and the punch sleeve (9) provided with a tube (8), that the strip (5) is stopped for a short moment straight in front of the tube end (12) when the punch (7) makes its working stroke in a movement forwards and backwards and that after each working stroke of the punch (7) the plugged tube (8) is removed and a new tube (8) is brought into position in the punch sleeve (9) in order to wait for the next working stroke of the punch (7) providing the new tube end (12) with a following plug.

3. An arrangement for closing of at least one end of a tube for protecting the tube against internal dirtying, characterized in that a strip (5) feedable from a supply reel (3) comprising plugs (4) situated one after another, a punch (7) displaceable forwards and backwards over an opening gap (6) for cooperation with a punch sleeve (9) supporting the tube (8) with its end (12) directed in line with the moving direction of the punch (7), said strip (5) is feedable forwards through the opening gap (6) in order to press a plug (4) into the tube end (12) and punching out each plug (4), pressed into the tube end, from said strip (5) at the end of the forward displacement of the punch (7).

4. An arrangement according to claim 3, characterized in that a driving cylinder (10) is provided by aid of its piston stem (17) to influence the punch (7) to make its displacement movement forwards and backwards for pressing in and punching out the plugs (4).

5. An arrangement according to claim 3, characterized in that said strip (5) and tube end (12) are disposed such that said punch (7) simultaneously presses a plug (4) into the tube end (12) and punches out said plug (4) at the end of the forward displacement of said punch (7).

6. An arrangement according to claim 4, characterized in that said strip (5) and tube end (12) are disposed such that said punch (7) simultaneously presses a plug (4) into the tube end (12) and punches out said plug (4) at the end of the forward displacement of said punch (7).

7. A method according to claim 2, characterized in that said punch (7) simultaneously presses the plug (4) into the tube and punches out plug (4) from said strip (5).

8. A method according to claim 1, characterized in that said punch (7) simultaneously presses the plug (4) into the tube and punches out plug (4) from said strip (5).

* * * * *